United States Patent

[11] 3,557,328

[72] Inventors  Ray F. Winogrocki
                East Detroit;
                Stephen J. Brzpzowski, Jr., Detroit; Gerald
                L. McClure, Warren, Mich.
[21] Appl. No. 702,654
[22] Filed      Feb. 2, 1968
[45] Patented   Jan. 19, 1971
[73] Assignee   Essex International, Inc.
                a corporation of Michigan

[54] DIRECTION SIGNAL AND HAZARD WARNING
     SWITCH ASSEMBLY
     24 Claims, 7 Drawing Figs.
[52] U.S. Cl. .................................................. 200/61.27
[51] Int. Cl. ...................................................... H01h 3/16
[50] Field of Search .......................................... 200/61.27-
                                                    —61.38, 61.54, 169PB

[56]                  References Cited
                 UNITED STATES PATENTS
3,368,043   2/1968   Stoi et al. ...................... 200/61.34

3,371,172   2/1968   McLure ........................ 200/169P.B.
3,462,570   8/1969   Poleschuk .................... 200/61.34X Primary Examiner—Robert K. Schaefer
Assistant Examiner—M. Ginsburg
Attorney—Learman and McCulloch ABSTRACT: A vehicle direction signal assembly having direction signal operating means and independent hazard warning switch operating means including an actuating member movable linearly into and out of the path of a cam, rotatable in response to rotation of the vehicle's steering mechanism, movement of the actuator being transmitted to a contact carrier movable laterally of the actuator into and out of engagement with fixed contacts, the actuator and carrier having cooperable latch means for latching the actuator in the path of rotation of the cam whereby engagement between the cam and the actuator effects restoration of the latter and the carrier to their initial positions. The direction signal operating means and the hazard warning switch actuator include cooperable means operable in response to movement of the direction signal operating means to restore the hazard warning actuator and the contact carrier to their initial positions.

PATENTED JAN 19 1971
SHEET 1 OF 2
3,557,328
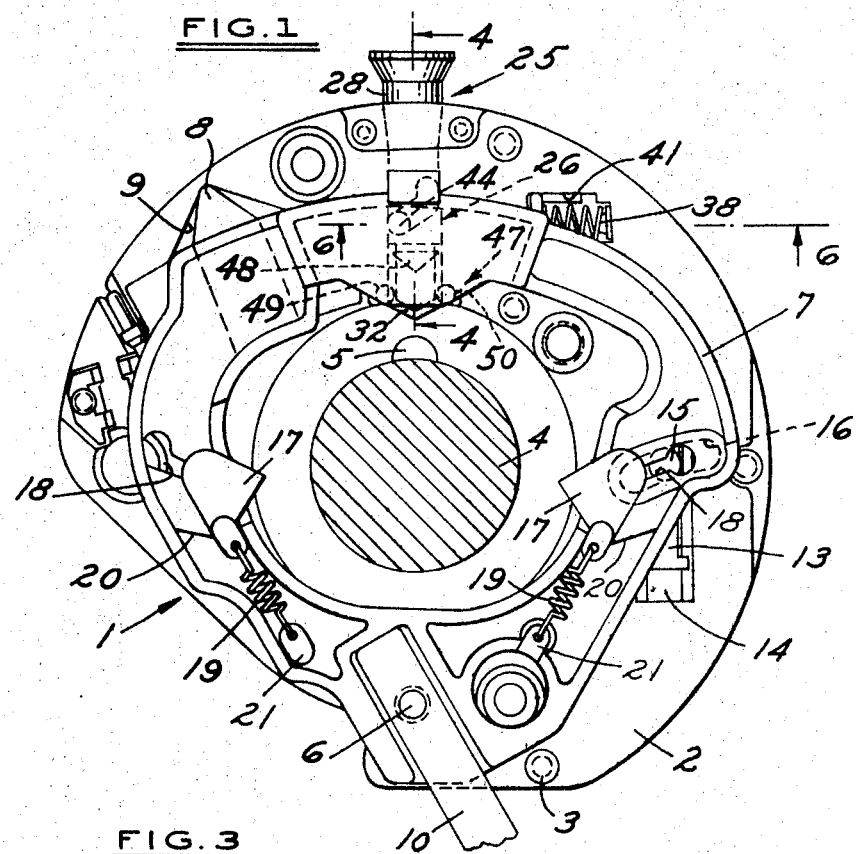
FIG.1
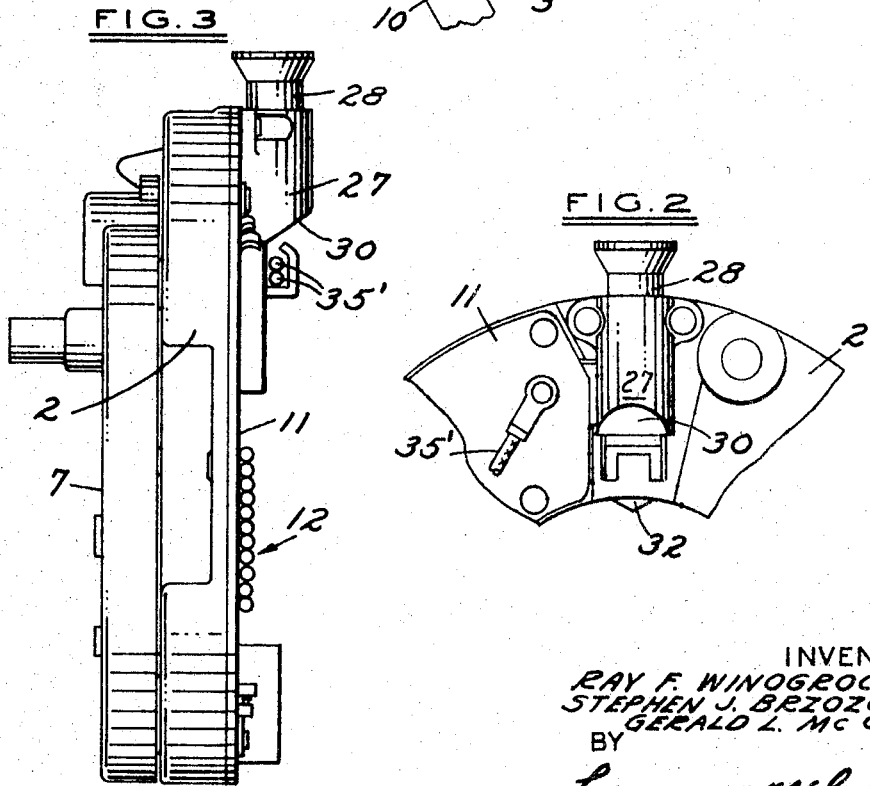
FIG.3
FIG.2
INVENTORS
RAY F. WINOGROCKI
STEPHEN J. BRZOZOWSKI,
GERALD L. McCLURE
BY
*Learman + McCulloch*
ATTORNEYS

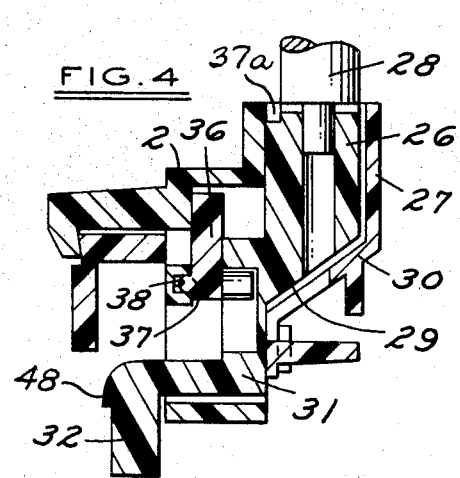
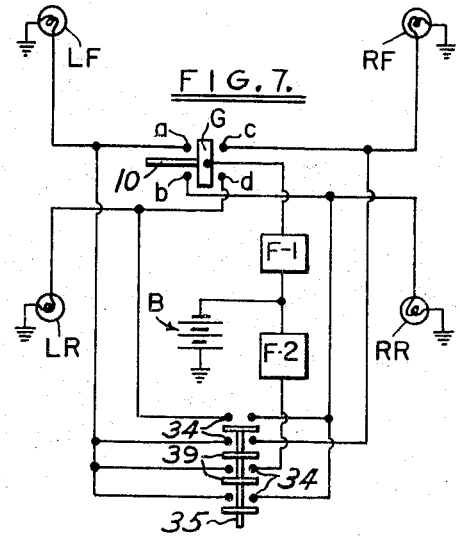
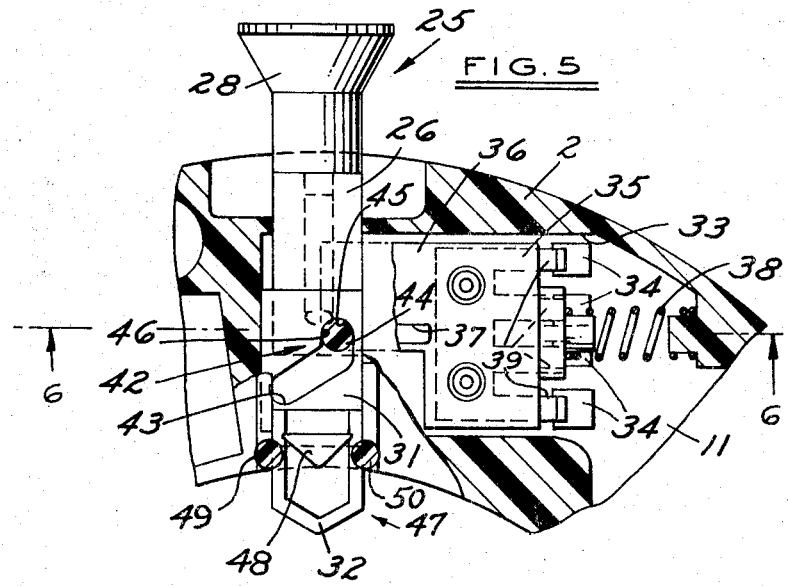
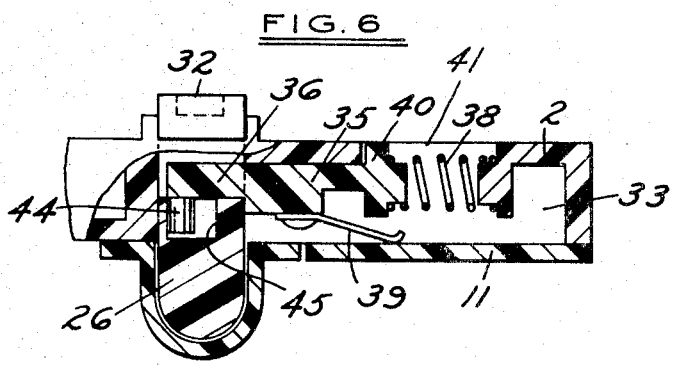

DIRECTION SIGNAL AND HAZARD WARNING SWITCH ASSEMBLY

The invention disclosed herein relates to automotive vehicle direction signaling apparatus, and more particularly to a direction signaling mechanism operable to actuate selectively either the left-hand or the right-hand set of turn indicating signals and including manually settable, automatically cancelable actuating means for energizing both the left-hand and the right-hand sets of signals simultaneously.

It is conventional practice to provide automotive vehicles with direction signal actuating means which is manually operable to indicate selectively either a left-hand or a right-hand turn, and which is so constructed that, upon completion of the turn, the turn indicating signals are extinguished or canceled automatically. It also is conventional to provide a manually settable, automatically cancelable hazard warning mechanism for energizing simultaneously both sets of turn signals so as to warn drivers of approaching vehicles of a potentially hazardous condition. The automatic cancellation of the hazard warning signalling devices is preferred, particularly for passenger vehicles, so as to minimize the possibility that a vehicle will be driven along a highway with both sets of signals flashing simultaneously.

It has been the custom heretofore to effect cancellation of the hazard warning signal by the same cam structure which is utilized to effect cancellation of the turn signal actuating mechanism. Such an arrangement is desirable because it eliminates the necessity of providing one canceling device for the direction signal actuating mechanism and a separate canceling device for the hazard warning mechanism, but such constructions in the past have been subject to criticisms. For example, the hazard warning switch actuator has had to be spring-pressed to its inactive position to prevent its inadvertent operation, thereby necessitating the provision of means to latch the actuator in its operative position. To overcome the force of the biasing means, the latch has had to be quite positive in its operation and has necessitated structural enlargement or strengthening of the canceling cam means and the hazard warning mechanism beyond that desirable from economic and operating considerations.

Although the cancellation of an activated hazard warning signal by means of the turn signal canceling cam structure provides for substantially foolproof canceling of the hazard warning signals, it is possible under some circumstances that the canceling of such signal may be delayed beyond what is considered a reasonable time. That is, the canceling cam may be so positioned that the steering wheel must be turned through a substantial arc before the cam can operate to cancel the hazard warning signal. The delay in canceling of the hazard warning signal can be avoided if it can be canceled either by rotation of the steering wheel or by operation of the direction signal operator means.

It is an object of this invention to provide hazard warning switch actuating means as part of automatically cancelable direction signaling means and in which the hazard warning switch actuator may be moved from an operative position to an inoperative position by the same means utilized to cancel the direction signaling means and without the necessity of strengthening or enlarging the canceling means.

Another object of the invention is to provide apparatus of the kind described and in which such little force is required to move the hazard warning switch operating means from an inactive to an active position, and return, that the parts of the operating means can be manufactured quite inexpensively without jeopardizing their reliability.

A further object of the invention is to provide hazard warning switch operating means which may be restored from its operative position to its inoperative position in response to movement of the direction signal operating means from any one of its positions to another position.

Other objects and advantages of the invention will be pointed out specifically or will become apparent from the following description when it is considered in conjunction with the appended claims and the accompanying drawings, in which:

FIG. 1 is a fragmentary view, partly in plan and partly in section, illustrating direction signaling apparatus incorporating hazard warning switch actuating means constructed in accordance with the invention;

FIG. 2 is a fragmentary, bottom plan view of the hazard warning switch actuator in its inoperative position;

FIG. 3 is a side elevational view of the apparatus shown in FIG. 1;

FIG. 4 is a sectional view taken on the line 4—4 of FIG. 1, but illustrating the hazard warning switch actuator in its operative position;

FIG. 5 is a fragmentary, enlarged, partly sectional and partly plan view of a portion of the apparatus shown in FIG. 1 but illustrating the actuator in its latched operative position;

FIG. 6 is a sectional view taken on the line 6—6 of FIGS. 1 and 5; and

FIG. 7 is a schematic wiring diagram of a vehicle turn signal and hazard warning circuit.

Apparatus constructed in accordance with the invention is adapted for use in conjunction with direction signaling apparatus designated generally by the reference character 1 and comprising a generally circular support 2 molded from electrically insulating material. The support may be fixed to a tubular column (not shown) by means of screws 3 and which surrounds a rotatable steering shaft 4 which is provided with one or more radially projecting canceling cams 5 that rotate in an orbital path in response to rotation of the steering shaft 4. Pivoted at 6 on the support 2 is a generally circular direction signal operating member 7 molded of insulating material and which is provided with a reciprocable, spring pressed positioning pawl 8 that is adapted to be accommodated in a notch 9 formed in the support 2. A lever 10 is secured to the operating member 7 so as to rock the latter either left or right from the neutral position shown in FIG. 1 about the axis of the pivot pin 6 so as to actuate either the left-hand direction signals LF and LR or the right-hand direction signals RF and RR. The pawl 8 normally is accommodated in the notch 9 so as yieldably to maintain the operator 7 in its neutral position, but rocking of the operator will cause the pawl 8 to be retracted into the operator so as to enable the latter to be rocked to either a left-hand or right-hand turn indicating position.

Secured to the lower surface of the support 2 is a plate 11 (FIG. 3) formed of insulating material on which is supported a plurality of fixed contacts $a$, $b$, $c$ and $d$. To the fixed contacts are secured conductors indicated generally by the reference character 12 and which connect the fixed contacts to a battery B or source of electrical energy, a flasher unit F–1 and to the signaling indicators, as is conventional. Between the contact plate 11 and the operator 7 is a carrier block 13 formed of insulating material and on which is mounted a conductor G that is adapted to engage and disengage the fixed contacts on the plate 11. The block 13 projects through a slot 14 formed in the support member 2 and includes an upstanding pin 15 which is accommodated in a groove 16 formed in the operator 7. The arrangement is such that rocking movement of the operator 7 about the axis of the pin 6 effects movements of the switch block 13 so as selectively to energize the left-hand or right-hand set of direction signal indicators.

The operator 7 is provided on diametrically opposite sides of the steering shaft 4 with direction signal canceling fingers 17, each of which includes a pin which extends into a slot 18 formed in the operator 7 so as to mount the finger 17 for rocking movements about the axis of the pin and for movements longitudinally of the slot. To each finger 17 is connected one end of a tension spring 19 which normally maintains the finger 17 against a stop 20, the opposite end of each spring being secured to an anchor 21 carried by the actuator. The arrangement is such that, when the operator 7 is in its neutral position, as shown in FIG. 1, each finger 17 is out of the path of rotation of the cam 5. When the operator is rocked to one of its turn indicating positions, however, one or the other of the fingers 17 will be located in the path of rotation of the cam 5. When the shaft 4 is rotated in the direction of the turn being made, the cam 5 displaces the finger 17 lying in its path as is permitted by the ability of that finger to rock and move bodily relatively to the operator 7. Rotation of the steering shaft in the opposite direction, however, causes the cam 5 to engage the projected finger 17 and exert a force against the associated stop 20 so as to rock the operator in a direction to return it to its neutral position.

The apparatus described thus far forms no part of the invention per se aside from the manner in which such apparatus cooperates with that yet to be described. The direction signaling mechanism thus far described corresponds substantially to that disclosed in U.S. Letters Pat. No. 3,459,909, granted Aug. 5, 1969, and to which reference may be had for a more detailed disclosure.

Hazard warning switch operating mechanism constructed in accordance with the invention is designated generally by reference character 25 and comprises an actuator member 26 mounted in a hollow housing 27 carried by the support 2. The actuator 26 has secured to its rear end an operating knob 28 which projects beyond the support 2, and at its forward end the member 26 has an inclined surface 29 which is adapted to abut a correspondingly inclined wall 30 of the housing 27 so as to limit movement of the actuator 26 radially inwardly of the support 2. Extending forwardly from the terminal end of the inclined portion 29 is a flat neck portion 31 that is offset laterally from the axis of the knob 28 and which terminates in a forwardly projecting, wedge-shaped return member or tongue 32.

The actuator 26 is reciprocable substantially diametrically of the steering shaft 4 along a linear path from an inoperative position, as is shown in FIG. 1, to an operative position as shown in FIGS. 4 and 5. Movement of the actuator 26 is independent of the direction signal operator 7. In the inoperative position of the actuator, the tongue 32 is clear of the path of rotation of the cam 5, but in the operative position of the actuator the tongue 32 lies in the path of rotation of the cam 5. Radially outward movement of the actuator 26 is limited by the engagement of the neck portion 31 and the wall of the support member 2. (See FIG. 4.)

Adjacent the housing 27 and communicating with the latter is a recess 33 formed in the support member 2. The bottom of the recess is closed by the contact plate 11 on which is secured a plurality of fixed contacts 34. The contacts 34 are joined to wires 35' which connect the vehicle's left-hand and right-hand direction signals to a flasher F-2.

Mounted in the recess 33 for reciprocating movements along a linear path substantially normal to the path of reciprocation of the actuator 26 is a carrier block 35 formed of insulating material, the block having an extension 36 which overlies the neck 31 of the actuator 26. The upper surface of the extension 36 includes an upstanding rib 37 that is accommodated in a groove 37a (FIG. 4) formed in the support member 2 so as to guide the block 35 in its movements. The block 35 constantly is biased to the left, as viewed in FIG. 5, by means of a compression spring 38 which acts between the block 35 and the adjacent end of the recess 33. The block 35 carries a conductive member on its lower surface having a plurality of resilient, electrically conductive fingers 39 which are adapted to engage and disengage the fixed contacts 34 in response to back and forth movements of the carrier 35. The resilience of the fingers 39 maintains the rib 37 in the guide 37a. When the block 35 is in the position shown in FIG. 5, the contacts 34 and 39 are in engagement, but when the block is in the position shown in FIGS. 1 and 6, the respective contacts are disengaged.

The spring 38 constantly biases the block 35 to move toward its inoperative position, i.e., toward the left, as viewed in FIGS. 5 and 6. Such movement of the carrier 35 is limited by an upstanding tongue 40 formed on the carrier 35 and which projects through an opening 41 formed in the support member 2.

Motion transmitting means 42 is provided to transmit movement of one of the members 26 and 35 to the other. In the disclosed embodiment, the motion transmitting means comprises a guide slot 43 formed in the neck portion 31 of the actuator 26 and a drive pin 44 carried by the extension 36 of the carrier block 35 and which is accommodated in the slot 43. As is best illustrated in FIGS. 1 and 5, the slot 43 extends obliquely to the paths of reciprocation of both of the members 26 and 35, the inclination of the slot being substantially 45° to the respective paths of reciprocation of the members 25 and 35.

As is shown in FIGS. 1 and 5, the slot 43 is inclined radially outwardly and toward the member 35. Consequently, movement of the actuator 26 radially outwardly locates the motion transmitting pin 44 at the radially inner end of the slot 43, thereby positioning the carrier member 35 in its inoperative position in which the contacts 34 and 39 are disengaged. Conversely, radially inward movement of the actuator 25 effects displacement of the pin 44 to the right, as viewed in FIG. 1, so as to move the carrier member 35 to its operative position in which the contacts 34 and 39 are engaged. In the operative position of the carrier member 35 the contacts 34 are bridged by the contacts 39 so as to energize both the left-hand and right-hand sets of direction signaling indicators to cause both sets to flash simultaneously. Moreover, the actuator 26 will be in such position that the tongue 32 will be located in a path of rotation of the cam 5.

It is preferred that the members 26 and 35 be capable of being latched in their operating positions. Accordingly, latch means is provided and comprises an extension 45 of the recess 43, the extension extending axially of the member 26 so as to provide a short, linear sidewall 46. The arrangement is such that, when the actuator member 26 has been pushed radially inwardly a distance sufficient to cause the motion transmitting pin 44 to traverse the length of the oblique slot 43, slightly further inward movement of the member 26 will cause the pin 44 to enter the extension slot 45 whereupon the spring 38 will act on the carrier member 35 to cause the pin 44 to bear against the linear wall portion 46. In these positions of the parts, the force of the spring 38 will be transmitted wholly axially of the latter and the pin 44 will bear against the wall 46 with sufficient frictional force to maintain the members 25 and 35 in their operating positions.

When the members 26 and 35 are in their operating positions, the tongue 32 of the actuator 26 will lie in the path of rotation of the cam 5. Upon rotation of the cam 5, in either direction, the latter will engage the projecting tongue 32 and exert a force on member 26 tending to push the actuator radially outwardly. When the actuator member 26 has been pushed radially outwardly by the cam a distance sufficient to enable the pin 44 to clear the extension slot 45, the spring 38 will continue to act on the carrier member 35 so as to cause the latter to be urged to the left, as viewed in FIG. 5. Since the slot 43 is oblique, however, the force of the spring 38 will be resolved into two components one of which is axial of the spring 38 and the other of which is axial of the member 26. Accordingly, the spring 38 will effect restoration of the parts 26 and 35 to their inactive positions, as is indicated in FIG. 1.

An important characteristic of the invention is that it is not necessary that the cam 5 overcome the force of the spring 38 in order to return the members 26 and 35 to their inoperative positions. Instead, it is necessary that the cam 5 overcome only the frictional force with which the pin 44 engages the slot wall 46. This force is considerably less than that of the spring 38. Consequently, the operating forces to which the actuating member 26, the cam 5, and all other parts of the mechanism are subjected are quite small. The operating parts, therefore, can be quite fragile without risk of breakage.

It is not necessary that the parts of the hazard warning mechanism be returned to their inoperative positions by means of the cam 5. The parts can be restored to their inoperative positions manually in response to movement of the member 26 radially outwardly by means of the knob 28.

Apparatus constructed in accordance with the invention includes auxiliary canceling means 47 cooperable between the hazard warning switch actuating member 26 and the direction signal operating member 7 for effecting cancellation of the hazard warning signal in response to movements of the actuating member 7. The auxiliary canceling means comprises a cam or abutment 48 carried by the member 26 and a pair of spaced apart drive pins 49 and 50 carried by and depending from the member 7. The cam 48 is wedge-shaped and projects above the upper surface of the member 26 adjacent the radially inner end of the latter, but terminates short of the inner end of the tongue 32. The pins 49 and 50 straddle the member 26, when the operating member 7 is in its neutral position, and extend downwardly a distance which is insufficient to engage the tongue 32 but which is sufficient to engage the cam 48. The position of the cam 48 is such that it may be engaged by either of the pins 49 and 50 when the actuator 26 is in its operative position, but is clear of both pins 49 and 50 when the actuator 26 is in its inoperative position.

The construction and arrangement of the auxiliary canceling means 47 are such that, when the hazard warning actuating member 26 is in its inoperative position, as shown in FIG. 1, the direction signal actuating member may be rocked in either direction from its neutral position, and return, without any contact being made between the cam 48 and either of the pins 49 or 50. When the actuating member 26 is in its operative position, however, the cam 48 will be in the path of movement of the pins 49 and 50, so regardless of the direction in which the operator 7 is rocked from its neutral position one of the pins will engage the cam 48 and move it radially outwardly so as to release it from its latched position.

The auxiliary canceling pins 49 and 50 are of such diameter and are so located that, whenever the direction signal operator 7 is rocked from its neutral position to either of its operating positions, one of the pins 49 or 50 will be moved past the longitudinal centerline of the cam 48 so as to make it possible for the actuator 26 to be moved to its operative position regardless of the position of the member 7. Moreover, movement of the actuator 26 to its operative position when the member 7 is in one of its turn indicating positions will condition the canceling pin 49 or 50 which lies adjacent the cam 48 to engage the latter upon return of the operator 7 to its neutral position and effect restoration of the actuator 26 to its inoperative position. Accordingly, the auxiliary canceling means 47 is operable to effect cancellation of the hazard warning signal in response to movement of the direction signal actuator from any one of its positions to another.

This disclosure is representative of a presently preferred form of the invention, but is intended to be illustrative rather than definitive thereof. The invention is defined in the claims.

We claim:

1. In a switch construction, operating means comprising a carrier member; means mounting said carrier member for movement along a path from a first position to a second position; an actuating member; means mounting said actuating member for movement along a path from a first position to a second position; motion transmitting means connecting said members to each other for transmitting movement in either direction of either one of said members to the other; and latch means acting between said members when they are in their respective second positions for holding said members in their second positions.

2. The construction set forth in claim 1 including means acting on at least one of said members and biasing the latter to its said first position.

3. The construction set forth in claim 1 including return means carried by said actuating member for returning the latter from its second position to its first position.

4. The construction set forth in claim 1 including electrical contact means carried by one of said members and movable with the latter.

5. The construction set forth in claim 4 including electrically conductive means; and means mounting said conductive means in the path of movement of said contact means.

6. The construction set forth in claim 1 wherein the paths of said members are substantially normal to each other.

7. In a switch construction for use with cam means rotatable in an orbital path, operating means comprising a carrier member; means mounting said carrier member for movement along a first path from a first position to a second position; an actuating member; means mounting said actuating member for movement from a first position to a second position along a second path and substantially diametrically of said orbital path; motion transmitting means connecting said members to each other for transmitting movement in either direction of either one of said members to the other; and means for releasably latching said members in their respective second positions, said actuating member being clear of the path of movement of said cam means when in its said first position and in the path of movement of said cam means when in its said second position, engagement between said cam means and said actuating member effecting release of said latching means.

8. The construction set forth in claim 7 wherein said motion transmitting means comprises a drive member carried by one of said members and accommodated in a guide slot formed in the other of said members.

9. The construction set forth in claim 7 wherein said first and second paths are substantially normal to one another.

10. The construction set forth in claim 9 wherein said motion transmitting means comprises a drive member carried by one of said members and accommodated in a guide slot formed in the other of said members, said slot extending obliquely of each of said first and second paths.

11. The construction set forth in claim 10 wherein said latching means comprises an extension in said slot for reception of said drive member, said extension extending substantially parallel to said second path.

12. The construction set forth in claim 11 including spring means acting on one of said members and constantly biasing the latter to its said first position.

13. The construction set forth in claim 12 wherein the said spring means exerts forces on said actuating member and said carrier member parallel to their respective paths of movement.

14. In a switch construction, operating means comprising a carrier member; means mounting said carrier member for reciprocation along a first path; an actuating member; means mounting said actuating member for reciprocation along a second path substantially normal to said first path; means connected to one of said members for moving the latter in one direction along its path; motion transmitting means connecting said members to each other for transmitting movement in either direction of either one of said members to the other; and means acting on one of said members for moving the latter in a direction opposite to said one direction.

15. The construction set forth in claim 7 including movable means mounted for movement independently of said actuating member; and cooperable means on said movable means and on said actuating member operable in response to movement of said movable means relatively to said actuating member to release said latching means.

16. The construction set forth in claim 15 wherein said cooperable means comprises a first part on said movable means movable in a path and a second part on said actuating member movable into the path of said first part.

17. The construction set forth in claim 16 wherein said second part comprises a cam on said actuating member and wherein said first part comprises at least one pin engageable with said cam.

18. Direction and hazard warning signaling apparatus comprising support means; direction signal operating means mounted on said support means for movement from a neutral position to an operating position; hazard warning signal actuating means; means mounting said actuating means on said support means for movement independently of said operating means from an inoperative position to an operative position; and means cooperable between said operating means and said actuating means for returning the latter to said inoperative position in response to movement of said operating means.

19. Apparatus as set forth in claim 18 wherein said cooperable means comprises driving means on said operating means movable therewith and abutment means on said actuating means movable into the path of movement of said driving means.

20. Direction and hazard warning signaling apparatus for use with cam means movable in an orbital path, said apparatus comprising a direction signal operating member mounted for rocking movements from a neutral position to either one of two operating positions, and return; a hazard warning signal actuating member; means mounting said actuating member for movement from an inoperative position to an operative position; return means carried by said actuating member and movable in response to movement of said actuating member to said operative position into the path of said cam means for engagement therewith, engagement between said return means and said cam means effecting return of said actuating member to said inoperative position; and cooperable means on said members operable in response to movement of said operating member from said neutral position to either of said operating positions when said actuating member is in said operative position to return said actuating member to said inoperative position.

21. Apparatus as set forth in claim 20 wherein said cooperable means comprises an abutment on said actuating member and a pair of driving pins on said operating member straddling said abutment and engageable therewith.

22. Apparatus as set forth in claim 21 wherein one of said pins is engageable with said abutment in response to movement of said operating member from either of said operating positions to said neutral position.

23. In combination with signaling apparatus for a vehicle having normally inactive left-hand and right-hand signaling indicators, means for turning said vehicle selectively to the left or to the right, operating means for operating selectively either said left-hand or said right-hand signaling indicators, and actuating means movable from an inoperative position to an operative position for operating said left-hand and said right-hand signaling indicators simultaneously: the improvement comprising of means for returning said actuating means from its operative position to its inoperative position in response to operation of either said turning means or said operating means.

24. The construction set forth in claim 23 wherein said operating means and said actuating means are operable independently of one another.